United States Patent [19]
Li et al.

[11] Patent Number: 5,149,512
[45] Date of Patent: Sep. 22, 1992

[54] CATALYTIC REDUCTION OF NOX USING METHANE IN THE PRESENCE OF OXYGEN

[75] Inventors: Yuejin Li, Allentown; John N. Armor, Orefield, both of Pa.

[73] Assignee: Air Products and Chemicals, Inc., Allentown, Pa.

[21] Appl. No.: 739,273

[22] Filed: Aug. 1, 1991

[51] Int. Cl.$^5$ .......................... B01J 8/00; C01B 21/00
[52] U.S. Cl. ...................................... 423/239; 423/351
[58] Field of Search .................. 423/239, 239 A, 235, 423/235 D, 351

[56] References Cited

U.S. PATENT DOCUMENTS

| | | | |
|---|---|---|---|
| 4,867,954 | 9/1989 | Staniolis et al. | 423/239 |
| 4,869,735 | 9/1989 | Miyazawa et al. | 423/239 |
| 5,017,538 | 5/1991 | Takeshima | 502/64 |

FOREIGN PATENT DOCUMENTS

| | | | |
|---|---|---|---|
| 291258 | 9/1987 | Japan . | |
| 63-119850 | 5/1988 | Japan | 423/239 |

OTHER PUBLICATIONS

Adlhart, et al. R. E. Chem. Eng. Pro. 76, 73 (1971).
Ault and Ayen, R. J., AIChE J. 17, 265 (1977).
Hamada and coworkers, Appl. Catal. 64, L1(1990).
Catal. Lett. 6, 239 (1990).
Iwamoto and coworkers (Shokubai 32, 6 430 (1990)).

*Primary Examiner*—Gregory A. Heller
*Attorney, Agent, or Firm*—Keith D. Gourley; James C. Simmons; William F. Marsh

[57] ABSTRACT

The invention describes a catalytic process for destroying NOx from oxygen-containing combustion products wherein methane serves as a reductant. The process comprises contacting the NOx-containing combustion products with a desired amount of methane and oxygen in the presence of a metal-exchanged crystalline zeolite having a silicon to aluminum ratio of greater than or equal to about 2.5 under conditions sufficient to effect conversion to gaseous nitrogen, water and carbon oxides. The zeolites are exchanged with a cation selection from the group consisting of cobalt, nickel, iron, chromium, rhodium and manganese.

35 Claims, No Drawings

CATALYTIC REDUCTION OF NOX USING METHANE IN THE PRESENCE OF OXYGEN

TECHNICAL FIELD OF THE INVENTION

The present invention describes a pollution control process wherein nitrogen oxides present in combustion products, such as flue gases, are catalytically converted in the presence of methane and oxygen to the corresponding reduction products of nitrogen gas, carbon oxides and water. The process utilizes metal-exchanged crystalline zeolite catalysts having a silicon to aluminum ratio of greater than or equal to about 2.5.

BACKGROUND OF THE INVENTION

Nitrogen oxide emissions, principally nitrogen dioxide ($NO_2$) and nitric oxide (NO), collectively referred to as NOx, have been linked to urban smog, acid rain and numerous harmful health effects. Of all NOx emissions produced in the United States, an estimated 55 percent is attributed to stationary sources such as utility boilers, industrial boilers, gas turbines and stationary engines.

The U.S. Environmental Protection Agency has promulgated New Source Performance Standards (NSPS) to define limits on allowable NOx emissions permitted from such stationary sources in order to abate the harmful effects caused by such emissions. However, NOx emission levels exceeding NSPS occur in many combustion facilities rendering the point source susceptible to fine and/or interruption of business.

In order to enhance the air quality surrounding such point sources and to promote cleaner burning combustion processes, three major approaches have been undertaken to reduce NOx emissions: (1) Making modifications before combustion; (2) Making modifications during combustion; and (3) Adding controls after combustion. Typical precombustion modifications include switching fuel stocks, emulsifying the fuel with water, and denitrifying the fuel. Typical combustion modifications include changing reaction stoichiometry, reducing combustion temperature and reducing process residence time. Adding controls after combustion is generally referred to as flue-gas treatment.

NOx reduction during combustion has been employed since the early 1970's and has achieved a limited degree of success in reducing NOx emissions. However, flue-gas treatment is typically required to obtain higher levels of NOx reduction and to meet the increasingly stringent NSPS. Flue-gas treatment consists of dry processes and wet processes. Dry flue-gas treatment processes are typically preferred over wet processes because they typically require less equipment and produce less waste that requires disposal.

Selective Catalyst Reduction (SCR) of nitrogen oxides using ammonia is currently considered one of the most efficient processes for removing NOx from flue gases. The SCR process is typically carried out on a titania supported vanadia catalyst employing $NH_3/NO$ ratios near 1.0 and temperatures ranging from 300° to 400° C. to achieve conversions of up to 90%. NOx conversion increases with $NH_3/NO$ ratio but higher ratios typically result in ammonia slip (ammonia breakthrough) which causes a secondary environmental problem.

The reaction pathway of SCR processes employing ammonia involves the oxidation of $SO_2$ to $SO_3$ by the vanadia catalyst followed by formation of $NH_4HSO_4$ and $(NH_4)_2S_2O_7$ which can cause corrosion and plugging of reactor components and catalyst deactivation. These problems coupled with equipment and operating costs associated with the storage, delivery and use of ammonia in SCR processes have led to a search for improved processes which do not utilize ammonia. However, such improved processes for removing NOx from oxygen-containing flue gases have eluded researchers.

Researchers have been investigating the use of hydrocarbons in the place of ammonia in SCR processes. Adlhart, et. al., R. E. Chem. Eng. Pro. 76, 73 (1971) studied the catalytic reduction of NOx in nitric acid tail gas using natural gas over alumina-supported platinum, palladium and rhodium catalysts. Results demonstrated that methane was the most difficult fuel to ignite among the fuels studied, requiring preheat temperatures of 480° to 510° C. Moreover, additional fuel in excess of the stoichiometric equivalent of total oxygen was required to completely remove NOx from the tail gas. For example, 1.7% methane was required to remove 0.23% NOx in tail gas having 3.0% oxygen at temperatures higher than 500° C.

Limitations associated with the use of methane in processes for removing NOx from flue gas were confirmed in subsequent studies. Ault and Ayen, R. J., AIChE J. 17, 265 (1977), investigated the catalytic reduction of NOx in a substantially oxygen-free combustion stream. NOx-containing flue gas was reacted in the presence of hydrocarbons including methane, ethane, ethylene, acetylene, propane, propylene, octane, benzene and cyclohexane over a barium-promoted copper chromite catalyst in an oxygen-free atmosphere. Under reaction temperatures ranging from 225° to 525° C., an increase in the number of carbon atoms comprising the hydrocarbon reducing agent generally resulted in a decrease in the temperature required to effect the subject nitric oxide reduction. For example, about 10% NO was converted to the corresponding reduction products using methane as the reducing agent at 500° C. wherein the nitric oxide inlet concentration was 1.0% and an amount of hydrocarbon 10% in excess of the stoichiometric requirement was employed.

Hamada and coworkers, Appl. Catal. 64, L1 (1990), Catal. Lett. 6, 239 (1990) studied the catalytic reduction of NOx in oxygen-containing flue gas using H-form zeolite and alumina catalysts and small amounts of propane and propene as reductants. The most active catalyst of three H-form zeolites studied was H-mordenite which gave the maximum nitric oxide conversion of 65% at 673° K. followed by H-ZSM-5 and HY. Na-ZSM-5 provided a nitric oxide conversion of 32% at 573° K.

The above-mentioned results suggest that NOx reduction efficiency depends not only on process operating temperatures but also on the type of catalyst and hydrocarbon employed as well as the amount of oxygen present in the NOx-containing flue gas. These factors have greatly impaired the ability to predict optimum catalysts and operating conditions in processes for removing NOx in combustion products such as flue gas.

Japanese Patent Application No. 291258/1987 discloses a zeolite catalyst for destroying NOx in automotive exhaust gas. The zeolite is ionically exchanged with a transition metal and carried on a refractory support. Preferred transition metals are copper, cobalt, chromium, nickel, iron and manganese. Copper is the most preferred. Preferred zeolites have a pore size ranging from 5 to 10 angstroms which is slightly larger than the molecular diameter of NOx. Methane was not disclosed as a reducing agent.

Iwamoto and coworkers (Shokubai 32, 6 430 (1990)) demonstrated the effectiveness of NO reduction over copper-exchanged zeolite catalysts using $H_2$, $CO_2$, $C_2H_4$, $C_3H_6$ and $C_3H_8$ as reductants. However, no data was presented for methane as a reductant. The rate of conversion to $N_2$ increased with increasing $O_2$ concentration and maximum conversion was obtained when $O_2$ was between 0.8 and 2.0%. The authors concluded that the presence of oxygen was indispensable to the progress of the reaction but that a large excess of oxygen resulted in a decline in the NO removal rate. Further, during a public meeting, Iwamoto stated that methane was not an effective reducing agent for converting NOx in the presence of oxygen when Cu-ZSM-5 served as a catalyst.

U.S. Pat. No. 5,017,538 discloses an improved method for producing an exhaust gas purification catalyst which comprises a ZSM-5 catalyst carried on a refractory support. The ZSM-5 catalyst is ion-exchanged with a copper carboxylate and ammonia solution. Although no details are known about the reaction mechanism, preliminary studies suggest that catalyst activity and reaction selectivity vary with the hydrocarbon utilized with $C_3H_6$ being preferable to $C_3H_8$. The method is improved by a small amount of oxygen.

Operators of natural gas (methane) fired power stations, industrial boilers and combustion processes have been searching for an efficient and inexpensive catalytic reduction process for removing NOx from oxygen-containing flue gases. However, a catalytic process for destroying NOx in oxygen-rich combustion products utilizing methane as a reductant has not been reported.

BRIEF SUMMARY OF THE INVENTION

The present invention relates to a process for catalytically removing NOx from oxygen-rich combustion products which utilizes a unique and unobvious combination of catalyst and reducing agent. Under appropriate process conditions, the claimed process provides conversion of NOx to the desired products, namely, nitrogen gas, water and carbon dioxide.

The process comprises contacting the NOx-containing combustion products with a desired amount of a reductant, methane, and oxygen under combustion conditions sufficient to convert the nitrogen oxides to gaseous nitrogen, water and carbon oxides. The process employs crystalline zeolites having a silicon to aluminum ratio of greater than or equal to about 2.5 wherein the zeolite is exchanged with a cation selected from the group consisting of cobalt, nickel, iron, chromium, rhodium and manganese.

The term, NOx, as used herein, refers to one or a mixture of two or more nitrogen oxides, including NO, $NO_2$, $N_2O$ and the like formed during typical combustion processes. The term combustion products, as used herein, refers to products formed during the combustion of any fuel, including but not limited to methane, propane, coal and the like.

In an alternate embodiment the metal-exchanged zeolite catalysts are subjected to further metal-exchange treatments to exchange the catalyst with additional cations. Such additional cations include those metals represented by the third period transition metals and members of Groups 8, 9 and 10 of the Periodic Table of the Elements as defined by the notation presented in Pure & Appl. Chem., 60, 3, pp. 431-436 (1988).

In another alternate embodiment, the ion-exchanged zeolites of the present invention are impregnated with various anionic and neutral species. Suitable impregnating moieties include oxidizing metals selected from Group 5, 6, 7 and 11 of the Periodic Table of the Elements as defined above.

The process according to this invention is capable of affording high conversion of NOx to environmentally safe products. The advantages afforded over conventional SCR processes include high NOx removal efficiency; use of a cost efficient reducing agent, methane; elimination of ammonia as a reducing agent, as taught in conventional SCR processes; the ability to operate the process in oxygen-rich flue gas and operation under mild temperatures and ambient pressure.

DETAILED DESCRIPTION OF THE INVENTION

The present invention relates to a process for catalytically removing NOx from oxygen-rich combustion products. The process utilizes a unique and unobvious combination of catalyst, namely, metal-exchanged crystalline zeolites, and a particular reducing agent, methane, to yield a process which demonstrates unexpectedly superior results for the removal of NOx from oxygen-containing combustion products.

The process comprises contacting the NOx-containing combustion products with a desired amount of methane and oxygen in the presence of a metal-exchanged crystalline zeolite having a silicon to aluminum ratio of greater than or equal to about 2.5. The subject zeolites are exchanged with a cation selected from the group consisting of cobalt, nickel, iron, chromium, rhodium and manganese. The present process for reducing NOx emissions is effected under reaction conditions sufficient to convert the nitrogen oxides to gaseous nitrogen, water and carbon oxides.

Throughout this Specification and appended Claims, the term, carbon oxides, refers to carbon monoxide and/or carbon dioxide although carbon dioxide is the typical and desirable product formed by this process under oxidizing conditions. The term, NOx, as used herein refers to one, or a mixture of two or more nitrogen oxides, including NO, $NO_2$, $N_2O$ and the like, formed during typical combustion processes. The term combustion products as used herein refers to products such as flue gases formed during the combustion of any fuel, including but not limited to methane, propane, coal and the like.

Applicants' process and the results obtained therefrom are most unexpected in view of the collective teachings of the prior art. Prior to this invention, no long lived, catalytic process employing crystalline zeolite catalysts was known for reducing NOx in an oxygen-containing combustion product wherein methane functioned as the reducing hydrocarbon.

For example, prior art processes using supported metal catalysts such as rhodium on alumina in the presence of methane were reported to be highly active for reducing nitric oxide present in substantially oxygen-free flue gas but the catalyst was substantially deactivated in the presence of oxygen. The poor performance of methane as a reducing agent in oxygen-containing combustion products was also demonstrated by Adlhart, et al, R. E. Chem. Eng. Pro. 76, 73 (1971) who studied the catalytic reduction of NOx in nitric acid tail gas using natural gas as a reductant over platinum, palladium and rhodium catalysts.

Adlhart demonstrated that methane was the most difficult fuel to ignite, among a group of fuels studied, requiring preheat temperatures of 480. to 510.C. Moreover, additional fuel in excess of the stoichiometric equivalent of total oxygen was required to completely remove NOx from the tail gas. For example, 1.7% methane was required to remove 0.23% NOx in tail gas having 3.0% oxygen at temperatures higher than 500° C.

A zeolite catalyst for destroying NOx in automotive exhaust gas was disclosed in Japanese Patent Application No. 291258/1987. The zeolite was ionically exchanged with a transition metal and carried on a refractory support. Preferred transition metals were copper, cobalt, chromium, nickel, iron and manganese with copper being most preferred. Methane was not disclosed as a reducing agent.

Based upon the collective teachings of the cited prior which state that methane is a poor reductant for destroying NOx in the presence of oxygen, one of ordinary skill in the art would conclude that the ion-exchanged zeolites disclosed in Japanese Patent Application No. 29128/1987, would be ineffective in reducing NOx in oxygen-containing combustion products when methane is used as the reductant.

Applicants have unexpectedly discovered that methane is an effective reductant for destroying NOx in the presence of oxygen when certain catalysts are employed. More particularly, Applicants have discovered that various metal exchanged zeolite catalysts effect the conversion of NOx in the presence of oxygen when methane is used as the reductant.

The combination of the defined metal-exchanged zeolite catalysts and use of methane as a reductant overcomes the problems associated with prior art processes wherein the presence of oxygen deactivates the catalyst. Unexpectedly, the present process is activated by the presence of oxygen and is not adversely affected by the presence of a substantial amount of oxygen.

The advantages afforded by the present invention over conventional SCR processes include high NOx removal efficiency; use of a cost effective reducing agent, methane; elimination of ammonia, used as a reducing agent in conventional SCR processes; and the ability to operate the process using oxygen-rich NOx sources under mild temperatures and ambient pressure.

The process of this invention is particularly suited for destroying NOx generated from stationary sources such as utility boilers, industrial boilers, gas turbines and stationary engines which utilize natural gas as a primary fuel. However, the present process can be easily adapted to remove NOx from combustion products formed by burning fuels other than natural gas wherein an amount of methane and oxygen sufficient to reduce NOx to its corresponding reduction products is injected into the combustion product by conventional means known in the art.

Applicants' process comprises contacting the NOx-containing combustion products with a desired amount of methane and oxygen in the presence of metal-exchanged natural or synthetic crystalline zeolites having a silicon to aluminum ratio of greater than or equal to about 2.5 under combustion conditions sufficient to convert NOx to gaseous nitrogen, water and carbon oxides.

The zeolites of the present invention can be used either in the alkali metal form, e.g., the sodium or potassium form; the ammonium form; the hydrogen form or another univalent or multivalent cationic form to the extent that such zeolites are capable of being exchanged with the metals discussed herein. Suitable crystalline zeolites include those materials which are stable under the described reaction conditions and which have a pore size sufficient to effect the subject reaction. While catalysts having a Si/Al ratio less than 2.5 prior to treatment appear to demonstrate only limited activity, such catalysts may be activated by subjecting the catalyst to dealumination according to methods well known in the art.

Zeolite catalysts to be metal-exchanged include MOR and MFI structured zeolites. Zeolites under the MOR designation include mordenite, Na-D, Ptilolite and Zeolon. Zeolites under the MFI designation include ZSM-5, Silicalite-1, Silicalite, Zeta-1, Zeta-3 and AZ-1.

Preferably, the catalysts to be exchanged are in their sodium form. Typically, the pore size of the base zeolite will range from about 5 to 15 angstroms although such a range is not to be construed as limiting the scope of this invention. The sodium form of ZSM-5 can be prepared by the procedures disclosed in U.S. Pat. No. 3,702,886, I & EC 24, 507 (1985) and Shiralkar, et. al., A. Zeolite, 9, 363, (1989), the disclosures which are specifically incorporated by reference herein.

LZ-M-5 zeolite, a synthetic material residing in the non-acid, sodium cation form and an example of a MOR structure type zeolite, is commercially available from Union Carbide Corporation, Chickasaw, Alabama. LZM-5 has the following chemical composition (wt % anhydrous)

| | |
|---|---|
| $SiO_2$ | 78.7 |
| $Al_2O_3$ | 12.5 |
| $Na_2O$ | 7.33 |
| $SiO_2/Al_2O_3$ (molar ratio) | 10.7 |
| $Na_2O/Al_2O_3$ (molar ratio) | 0.96 |

The term, mordenite, is meant to include those synthetic and naturally occurring zeolites having the mordenite topology as included under the general IUPAC structural code of mordenite (MOR). While naturally occurring mordenites vary widely in purity, the synthetic zeolites tend to have higher purity and controlled pore structure thereby rendering the synthetic mordenites preferable for catalytic applications.

Mordenite can be synthesized from a wide variety of starting materials of both chemical and natural origins. Synthetic mordenites are typically produced with Si/Al ratios ranging from 5 to about 12.5. Mordenite is a porous crystalline catalyst having a rigid three-dimensional anionic network with intracrystalline channels whose narrowest cross-section has essentially a uniform diameter. Mordenite is distinguished over crystalline alumino-silicate clays such as bentonite which have a two-dimensional layered structure and over alumino-silicates which are amorphous.

The original alkali metal cations of the zeolites according to this invention are preferably replaced in accordance with techniques well known in the art such as ion-exchange, acid-base and solid state reactions. For example, the alkali metal cations of the zeolite can be replaced, at least in part, by ion-exchange with from about 0.1 wt% to about 15 wt% (based upon the total weight of the catalyst) of one or more cations selected from cobalt, nickel, iron, chromium, chromium, rhodium and manganese.

In a preferred embodiment, the zeolites of this invention can be exchanged with a precious metal selected from the group consisting of platinum, palladium, ruthenium, rhodium and iridium. A suitable metal-exchange technique comprises contacting the zeolite with a solution which contains the salt of the desired replacing cation or cations. Examples of suitable salts include the halides such as chlorides, nitrates, carboxylates and sulfates. A preferred exchange solution is cobalt(II) acetate.

In an alternate embodiment the metal-exchanged zeolite catalysts can be subjected to further metal-exchange treatments to exchange sites on the catalyst with additional cations. Such additional cations include those metals represented by the third period transition metals and members of Groups 8, 9 and 10 of the Periodic Table of the Elements as defined by the notation presented in Pure & Appl Chem., 60, 3, pp. 431–436 (1988). Preferred cations include cobalt, nickel, iron, manganese and silver. The amount of second metal to be exchanged ranges from about 0.01 wt % to about 2 wt % based upon the total weight of the catalyst with the remaining portion of the exchanged metal comprising cobalt.

In another alternate embodiment, the metal-exchanged zeolites of the present invention are impregnated with various anionic and neutral species. Suitable species may be selected from oxidizing metals or their oxides formed from metals selected from Group 5,6,7 and 11 of the Periodic Table of the Elements as defined by the notation presented in Pure & Appl. Chem., 60, 3, pp. 431–436 (1988). The term, oxidizing metal, refers to a metal which is capable of catalyzing oxidation reactions and which affords enhanced catalytic activity when impregnated onto the metal-exchanged zeolites of the present invention. Preferred species include silver and oxides of niobium, molybdenum, vanadium and manganese. The amount of metal to be impregnated onto the metal-exchanged zeolite catalyst is that amount which is sufficient to achieve the desired selectivity and conversion to the NOx reduction products.

Generally, the amount of metal moiety impregnated onto the metal-exchanged zeolite catalyst ranges from about 0.01 to 15 wt%, and preferably between about 0.1 to 8 wt% based upon the total weight of the impregnated metal-exchanged zeolite catalyst. However, the level of impregnation should not be such that substantially all of the pores on the zeolite catalyst become clogged thereby rendering the catalyst inactive for the subject process.

The metal-exchanged and impregnated metal-exchanged catalysts of this invention may be subjected to thermal treatment prior to use in the process although such treatment is not required to practice the invention. The thermal treatment may be conducted in the reactor prior to contacting the reactants with the catalyst or as a separate step.

The thermal treatment comprises heating the catalysts of this invention to above ambient temperature, preferably between about 80. and 150.C while under an inert atmosphere of about 1 to 220 atmospheres for a period ranging from about 0.5 to 12 hours to remove residual moisture. The catalyst may be dried during one or more periods utilizing one or more discrete temperatures or temperature ramping techniques known in the art. The amount of time and temperature regime employed to dry the catalyst is not critical to the invention.

The amount of catalyst to be utilized in the present process varies depending upon the reaction conditions (i.e., temperature, pressure and the like), and the type and distribution of components comprising the NOx. An effective amount of catalyst is used, i.e., that amount which causes a reaction involving the oxygen, methane and NOx to selectively produce the desired reduction products.

The catalysts of the invention can be fabricated onto fire-proof supports known in the art including those customarily used in the automotive industry. A preferred support has a honey-comb design whereby surface area is maximized to enhance catalytic activity.

The process according to this invention is typically run at temperatures ranging from about 250° C. to 600° C. and pressures between about 1 and 300 atmospheres. More particularly, the process can be advantageously run under fixed bed conditions at temperatures ranging from about 350° C. to 500° C. and a gas hourly space velocity ranging from 1,000 to 100,000 hr$^{-1}$, preferably 7,500 hr$^{-1}$ to 30,000 hr$^{-1}$.

The amount of methane to be added to the NOx-containing combustion product such as flue gas is important in achieving satisfactory NOx reduction. NOx reduction is obtained by using a stoichiometric equivalent or less of methane with respect to NOx, but a stoichiometric excess of methane is preferred to ensure complete removal of NOx from the effluent stream. Generally, the methane/NOx ratio ranges from about 0.2 to 10, although preferably, the methane/NOx ratio is maintained between about 0.6 and 2.4.

The amount of oxygen to be added to the NOx-containing combustion product is not critical to this invention. Amounts substantially below stoichiometric amounts have been found sufficient to effect the present process although a stoichiometric excess with respect to NOx is preferred to ensure complete removal of NOx from the effluent stream.

The following examples are provided to further illustrate various embodiments of this invention and to provide a comparison between the enumerated catalysts of this invention and prior art catalysts for destroying NOx in oxygen-containing flue gases. These examples are provided to illustrate the nature of the process described herein and are not intended to limit the scope of the claimed invention. Unless otherwise stated, parts and percentages in the examples are given by volume.

EXAMPLE 1

Preparation of Metal-Exchanged Mordenite Zeolite

The metal-exchanged mordenite catalysts of the present invention are prepared according to the following general procedure. By way of example, Co-LZ-M-5 was prepared by submersing fifteen grams of LZ-M-5, obtained from Union Carbide Company, Chickasaw, Alabama, in a 2 liter Co(II)acetate solution (0.02 M) with stirring at 80° C. for 24 hours. The resulting cobalt exchanged catalyst was washed with 2 liters of distilled water for 1 hour and filtered followed by drying at 110° C. overnight.

EXAMPLE 2

Preparation of Metal-Exchanged MFI Structure Type Zeolites

The metal-exchanged MFI structure type catalysts of the present invention were prepared according to the following general procedure. For example, ZSM-5 was prepared according to the general procedure described in I & EC 24, 507 (1985) wherein a gel was prepared containing 30% silica solution, sodium hydroxide and aluminum hydroxide in the molar ratio of 3.9 $Na_2O/36$ $SiO_2/Al_2O_3/720$ water. The resulting gel was stirred at 165° C. in a PARR mini-reactor, filtered and washed with de-ionized water. The composition was verified by X-ray diffraction and elemental analysis. Fifteen grams of the resulting Na-ZSM-5, (Si/Al =14) were submersed in a 3.5 liter Co(II)acetate solution (0.01 M) with stirring at room temperature for 18 hours followed at 40° C. and 80° C. for 20 and 24 hours, respectively. The resulting cobalt-exchanged catalyst was washed with 3.5 liters of distilled water for 1 hour and filtered followed by drying at 110° C. for 5 hours. Elemental analysis demonstrated that the catalyst contained 4.0 wt % cobalt with a Co/Al ratio of 0.70 which corresponds to 140% of the theoretical exchange level.

EXAMPLE 3

Preparation of Metal Exchanged Co-ZSM-5 Catalyst

The following general procedure can be used to prepare metal exchanged Co-ZSM-5 catalysts. By way of example, Mn-exchanged Co-ZSM-5 catalyst was prepared by submersing five grams of Co-ZSM-5, prepared by the procedure according to Example 2, in 40 ml of a manganese acetate solution (0.01M) with stirring at room temperature overnight (The exchange temperature for preparing copper- and chromium-exchanged Co-ZSM-5 was room temperature while manganese- and nickel-exchange reactions were conducted at 80 C). The resulting manganese-cobalt-exchanged ZSM-5 catalyst was washed with 2 liters of distilled water for 1 hour and filtered followed by drying at 110.C for 5 hours.

EXAMPLE 4

Preparation of Niobium-Impregnated Co-ZSM-5 Catalyst 0.18g. $Nb(HC_2O_4)_5$ obtained from Kaweoki Berylco Industries, Inc., Boyertown, Pa., was dissolved in a solution of 0.55g $H_2C_2O_4 2H_2O$ in 10 ml water via ultrasonic vibration. 2 ml of the resulting solution was added dropwise with constant stirring to 3.04 g of Co-exchanged ZSM-5 catalyst prepared according to Example 2. The catalyst was dried overnight followed by re-impregnation under the same conditions. The resulting catalyst was dried overnight at room temperature followed by drying at 110 C for 24 hours. The niobium loading was determined to be 0.4 wt% based upon total catalyst weight.

EXAMPLE 5

Selective Catalytic Reduction of Nox With Methane and Oxygen

The following general procedure was utilized for effecting the catalytic reduction of NOx with methane and oxygen in the presence of the subject catalysts.

A reactor was constructed having a 4 mm i.d. glass tube with an expanded section (8-13 mm i.d.) as a catalyst bed. A separate inlet for admixing oxygen with the NO was provided at a position to enable thorough mixing just prior to contacting the reactants with the desired catalyst. The weight of catalyst used in these tests varied from a few tenths of a gram to one gram. The GHSV can be varied between 100 and 100,000 to achieve desired conversion levels. The reactor was surrounded by a temperature-controlled furnace. The temperature was monitored by a chromel-alumel thermocouple which was in contact with the catalyst bed.

The activity measurements were made with a microcatalytic reactor in a steady-state flow mode. Product analysis was obtained using an on-line gas chromatograph with a thermal conductivity detector. The separation column was packed with 5A molecular sieve (80/100 mesh) and was 4 feet long having a ⅛" outer diameter. Chromatograph temperature was 25° C. and the flow rate of the carrier gas was 30 $cm^3$/min.

Presentation of Data

The catalysts according to Examples 1 through 4 and various prior art catalysts were tested according to the procedure of Example 5 for catalytic reduction of NO in the absence of methane and oxygen, in the presence of methane, in the presence of methane and oxygen and in the presence of propene and oxygen. Reaction conditions were constant using the following feedstream: [NO]=0.16 %; [$CH_4$]=0.10%; [$C_3H_6$]=0.055%; [$O_2$]=2.5% and a GHSV of 30,000 $h^{-1}$.

The results presented in Table 1 demonstrate that while Cu-ZSM-5 (Run 2) provides good conversion of NO in the presence of methane (55% conversion) and propene (52% conversion), conversion decreases to 9% when NO is reacted in the presence of methane and oxygen over the Cu-ZSM-5 catalyst. In contrast, Co-ZSM-5 (Run 4) provides a conversion of 9% in the absence of oxygen but yields a 300% increase in conversion when a stoichiometric excess of oxygen is introduced in combination with methane as the reducing agent.

Runs 1 and 2 demonstrate that the prior art catalysts exhibit very high activity using methane as a reductant in the absence of oxygen. However, activity of the prior art catalysts plummets when oxygen is introduced into the system. These results demonstrate the unexpected nature of Applicants' catalytic process for destroying NOx in oxygen-containing combustion products wherein methane is used as a reductant in the presence of the enumerated metal-exchanged catalysts. Contrary to catalysts disclosed in prior art processes wherein the presence of oxygen decreases catalyst activity, the catalysts of the present invention exhibit a substantial increase in activity when oxygen is admixed with the methane reductant.

TABLE 1[a]

| Run | Catalyst (0.1 g) | Activity Comparison of Catalysts at 400° C (%) | | | |
|---|---|---|---|---|---|
| | | NO Decomp. | NO + CH$_4$ | NO + CH$_4$ + O$_2$ | NO + C$_3$H$_6$ + O$_2$ |
| 1 | Rh/Al$_2$O$_3$ | —[f] | 100 | 6 | 11 |
| 2 | Cu-ZSM-5* | 17 | 55 | 9 | 52 |
| 3 | Ce—Cu-ZSM-5* | 11 | 50 | 8 | 46 |
| 4 | Co-ZSM-5[b] | 4[b] | 9[c] | 26 | 48 |
| 5 | Nb/Co-ZSM-5[c] | 8[c] | 10[c] | 16 | 18 |
| 6 | Cu—Co-ZSM-5[d] | 9[c] | 24[c] | 17 | 45 |
| 7 | Ag—Co-ZSM-5[e] | 4 | 7 | 29 | ND |
| 7a | Na-ZSM-5* | —[f] | —[f] | —[f] | |

*Comparative Example N/D = no data
[a]GHSV = 30,000; [NO] = 0.16%; [CH$_4$] = 0.10%; [C$_3$H$_6$] = 550 ppm; [O$_2$] = 2.5% balanced by He.
[b]The activity decreased with time, and the conversion was taken when t = 1 hr.
[c]Impregnation of 0.4% of Nb onto a Co-ZSM5 catalyst.
[d]Obtained by exchanging Cu$^{2+}$ ion onto the Co-ZSM5.
[e]Ag/Co = 0.04
[f]no activity Table 2 provides a comparison of conversions achieved by reacting NO in the presence of methane and oxygen over various catalysts at defined temperatures. Table 2 demonstrates that cobalt, nickel, iron, chromium and manganese exchanged ZSM-5 (Runs 8, 10 and 11) and cobalt-exchanged LZ-M-5 (Run 9) exhibit significant activity of the subject reaction over a temperature range of 350° to 500° C.

TABLE 2

COMPARISON OF NO CONVERSIONS OVER VARIOUS CATALYSTS AS A FUNCTION TEMPERATURE

| Run | Catalyst | 350° C. | 400° C. | 450° C. | 500° C. | Total Metal (wt %) | Atomic ratio co-metal/Cobalt |
|---|---|---|---|---|---|---|---|
| 8 | Co-ZSM-5 | 8 | 21 | 34 | 29 | 4.0 | — |
| 9 | Co-LZ-M-5 | 6 | 17 | 27 | 24 | 5.5 | — |
| 10 | Mn-ZSM-5 | 7 | 17 | 30 | 32 | 3.1 | — |
| 11 | Ni-ZSM-5 | 6 | 16 | 26 | 20 | 4.3 | — |
| 11a | Cr-ZSM-5 | — | — | — | 5 | 0.3 | — |
| 11b | Fe-ZSM-5 | — | 8 | 9 | 12 | 1.0 | — |
| 12 | Co/Al$_2$O$_3$* | | | inactive | | | |
| 13 | Cu-ZSM-5* | 6 | 8 | 8 | N/A | 3.7 | — |
| 14 | Fe-ZSM-5 | N/A | 8 | 9 | 12 | 1.0 | — |
| 15 | Co-L zeolite | 5 | 7 | 9 | 11 | — | — |
| 16 | Co-Beta zeolite | 7 | 9 | 16 | 23 | — | — |
| 17 | Mn—Co-ZSM-5 | 8 | 20 | 33 | 29 | 5.5** | 0.07 |
| 18 | Cu—Co-ZSM-5 | 8 | 16 | 20 | 16 | 5.7** | 0.07 |
| 19 | Ni—Co-ZSM-5 | 9 | 23 | 35 | 29 | 5.6** | 0.06 |
| 20 | Cr—Co-ZSM-5 | 9 | 18 | 27 | 24 | 5.3** | 0.05 |
| 21 | Ag—Co-ZSM-5 | 9 | 24 | 34 | 27 | — | |

*Comparative Example
**wt % as cobalt
Experimental conditions:
GHSV = 30000 h$^{-1}$
[NO] = 0.16%
[CH$_4$] = 0.1%
[O$_2$] = 2.5%
N/A = no data available In Runs 17-21, some of the cobalt which was previously ion-exchanged into the ZSM-5 catalyst was exchanged with manganese, copper, nickel, chromium or silver. The activity of the catalyst appears directly related to the cobalt loading level.

Under the specified reaction stoichiometry, each of the catalysts according to Runs 8 through 11 and 14 through 21, inclusive provided maximum conversion at about 450 C. Run 12 demonstrates that cobalt metal supported on alumina is inactive for the reduction of NO in the presence of oxygen using methane as a reductant. Moreover, Cu-ZSM-5 (Run 13) provided relatively poor conversion to the desired reduction products compared to the Co-exchanged zeolite catalysts of the present invention when oxygen is present in the reactant stream.

Table 3 demonstrates the effect of the methane/NO ratio on NO conversion for the reaction of NO in the presence of methane and an excess of oxygen at a temperature of 400.C over Co-ZSM-5 prepared according to Example 2. Runs 22 through 25 demonstrate that the Co-ZSM-5 zeolites of the present invention provide a high degree of NO conversion over methane/NO ratios ranging from 0.6 to 2.4. In particular, Run 25 (methane/NO =2.4) provides a 95% conversion of NO to nitrogen gas. Overall, an increase in the methane/NO ratio provides higher conversion to the desired reduction products.

TABLE 3

EFFECT OF CH$_4$/NO RATIO ON NO CONVERSION FOR REACTION OF NO, OXYGEN AND METHANE OVER Co(II)-ZSM-5

| RUN | [NO] (ppm) | [CH$_4$] (ppm) | [CH$_4$]/[NO] | NO to N$_2$ (%) |
|---|---|---|---|---|
| 22 | 1600 | 1000 | 0.6 | 44 |
| 23 | 1300 | 1400 | 1.1 | 61 |
| 24 | 1000 | 1800 | 1.8 | 78 |

TABLE 3-continued

EFFECT OF CH$_4$/NO RATIO ON NO CONVERSION FOR REACTION OF NO, OXYGEN AND METHANE OVER Co(II)-ZSM-5

| RUN | [NO] (ppm) | [CH$_4$] (ppm) | [CH$_4$]/[NO] | NO to N$_2$ (%) |
|---|---|---|---|---|
| 25 | 820 | 2000 | 2.4 | 95 |

Reaction temperature = 400° C.
GHSV = 7500 h$^{-1}$ [O$_2$] = 2.5%

Table 4 demonstrates the effect of temperature on the conversion of NO over Co-ZSM-5 wherein the methane/NO ratio is 0.6 and 2500 ppm oxygen was present in the feedstream. Runs 26 through 30 illustrate that conversion reaches a maximum at approximately 425° C.

TABLE 4

EFFECT OF REACTION TEMPERATURE ON NO CONVERSION FOR REACTION OF NO, OXYGEN AND METHANE OVER Co-ZSM-5

| RUN | Temperature (°C.) | Conversion of NO to N$_2$ (%) |
|---|---|---|
| 26 | 350 | 21 |
| 27 | 375 | 35 |
| 28 | 400 | 44 |
| 29 | 425 | 46 |
| 30 | 450 | 39 |

Reaction conditions: GHSV = 7500 h$^{-1}$
[NO] = 1600 ppm;
[CH$_4$] = 1000 ppm;
[O$_2$] = 2.5%

Table 5 demonstrates the effect of the ratio of oxygen to methane on NO conversion for the reaction of NO over Co-ZSM-5 at 400° C. and a GHSV of 30,000 hr$^{-1}$. The oxygen/methane ratio was varied from 97/1 to 3/1. The results demonstrate that only a modest decrease in NO conversion is caused by increasing the oxygen/methane ratio from 97/1 (Run 31) to 3/1 (run 36). These results show that the present process can effectively reduce NO in combustion products having a broad range of oxygen content.

TABLE 5

EFFECT OF O$_2$/OH$_4$ RATIO ON NO CONVERSION OVER Co-ZSM-5 CATALYST

| RUN | [O$_2$] (%) | [CH$_4$] (%) | O$_2$/CH$_4$ | Conversion of to N$_2$ (%) |
|---|---|---|---|---|
| 31 | 4.0 | .041 | 97 | 18 |
| 32 | 3.4 | 0.066 | 52 | 20 |
| 33 | 2.7 | 0.094 | 29 | 23 |
| 34 | 2.0 | .12 | 16 | 24 |
| 35 | 1.3 | 0.15 | 9 | 26 |
| 36 | 0.6 | 0.18 | 3 | 27 |

Reaction conditions: GHSV = 30000 h$^{-1}$
Reaction Temperature = 400° C.
[NO] = 0.16%

Table 6 demonstrates the effect of oxygen content on reduction of NO at 400° C. over Co-ZSM-5 in the presence of methane as the reductant. The reaction stream contained equal amounts of NO and methane (820 ppm) and the oxygen content was varied. Runs 37 through 41 illustrate that NO conversion is enhanced and maintained essentially constant so long as some oxygen is present in the reaction.

Stated alternately, the presence of oxygen actually enhances the conversion of NO to the desired reduction products whereas the catalysts of the prior art are typically deactivated by the presence of oxygen. For example, Run 38 summarizes the reaction wherein 5000 ppm oxygen was utilized which provides 60% conversion to nitrogen gas. In contrast, use of over 5 times the stoichiometric amount of oxygen (Run 41) results in essentially no diminution of conversion.

TABLE 6

EFFECT OF OXYGEN CONCENTRATION ON NO CONVERSION OVER Co-ZSM-5 CATALYST

| RUN | Oxygen Concentration (ppm) | Conversion of NO to N$_2$ (%) |
|---|---|---|
| 37 | 0 | 17 |
| 38 | 5000 | 60 |
| 39 | 10000 | 60 |
| 40 | 20000 | 59 |
| 41 | 47000 | 58 |

Experimental conditions: GHSV = 7500 h$^{-1}$
Temperature = 400° C.
[NO] = [CH$_4$] = 820 ppm Table 7 provides a comparison of the activities achieved by using Co-ZSM-5 and Mn-ZSM-5 as a function of methane concentration at a temperature of 400° C. and a GHSV of 7,500 h$^{-1}$. Runs 42 through 46 demonstrate that when an excess of oxygen is utilized, use of greater than a stoichiometric amount of methane results in increased conversion of NO to nitrogen gas. In particular, Co-ZSM-5 (Run 46) provides a 97% conversion of NO to nitrogen gas when the methane/NO ratio is 2.5.

TABLE 7

COMPARISON OF Co-ZSM-5 and Mn-ZSM-5 ACTIVITY AS A FUNCTION OF METHANE CONCENTRATION

| Run | CH$_4$ (ppm) | CH$_4$/NO | Conversion Over Co-ZSM-5 | Conversion Over Mn-ZSM-5 |
|---|---|---|---|---|
| 42 | 250 | .30 | 26 | 22 |
| 43 | 620 | .76 | 47 | 39 |
| 44 | 1030 | 1.25 | 67 | 52 |
| 45 | 1440 | 1.75 | 80 | 64 |
| 46 | 2050 | 2.5 | 97 | 77 |

Experimental conditions: GHSV = 7500 h$^{-1}$
Temperature = 400° C.
[NO] = 820 ppm
[O$_2$] = 2.5%

The effect of metal loading on catalyst activity is presented in Table 8. The results demonstrate that catalyst activity is directly related to cobalt loading to a level of about 100% (Co/Al =0.5) for conversion of NO in the presence of methane and oxygen under the specified reaction conditions. Run 52 demonstrates that over-exchanging the zeolite with cobalt (Co/Al =1.05) does not cause a substantial decrease in catalyst activity.

TABLE 8

EFFECT OF METAL LOADING ON ZSM-5 CATALYST ACTIVITY

| Run | Co/Al | Reaction Temperature | | | |
|---|---|---|---|---|---|
| | | 350° C. | 400° C. | 450° C. | 500° C. |
| 47 | .22 | 6 | 12 | 20 | 24 |
| 48 | .23 | 7 | 13 | 22 | 27 |
| 49 | .33 | 8 | 18 | 29 | 33 |
| 50 | .68 | 9 | 23 | 34 | 30 |
| 51 | .70 | 8 | 21 | 34 | 29 |
| 52 | 1.03 | 9 | 23 | 34 | 30 |

Experimental conditions:
GHSV = 30000 h$^{-1}$
[NO] = 0.16%
[CH$_4$] = 0.1%
[O$_2$] = 2.5%

Table 9 discloses the results for conversion of NOx in the presence of methane and oxygen over rhodium exchanged ZSM-5 catalyst prepared according to the procedure in Example 2. More particularly, 5 grams of Na-ZSM-5 zeolite was exchanged in a 1-liter Rh(NO$_3$)$_2$ solution ([Rh$^{2+}$]=0.006M) twice at 25° C. and 70° C., respectively. The resulting preparation was dried at 110.C overnight. The elemental analysis showed a rhodium loading of 0.6% by weight. Run 55 demonstrates that 55% conversion to nitrogen gas was obtained when the reaction was conducted at 450° C.

TABLE 9
CONVERSION OF NOx OVER RHODIUM EXCHANGED ZSM-5 AS A FUNCTION OF TEMPERATURE

| RUN | TEMP (°C.) | CONVERSION TO N$_2$ (%) |
|---|---|---|
| 53 | 350 | 9 |
| 54 | 400 | 23 |
| 55 | 450 | 55 |
| 56 | 500 | 34* |

GHSV = 30,000 h$^{-1}$
[NO] = 0.16%
[CH$_4$] = 0.1%, [O$_2$] = 25%
*Not stable demonstrating a decrease over time The enumerated catalysts of the present invention provide several improvements over prior art processes for removing NOx from combustion processes wherein methane is used as a reductant. First, the claimed catalysts are unexpectedly more active and selective than prior art catalysts in converting NO to nitrogen gas in the presence of oxygen and methane; and second, the catalysts are not deactivated in the presence of a substantial stoichiometric excess of oxygen.

Having thus described the present invention, what is now deemed appropriate for Letters Patent is set forth in the following Claims.

What is claimed is:

1. A process for destroying nitrogen oxides comprising: reacting the nitrogen oxides, methane and oxygen in the presence of a crystalline zeolite having a silicon to aluminum ratio of greater than or equal to about 2.5 wherein the zeolite is exchanged with an effective amount of a cation selected from the group consisting of cobalt, nickel, iron, chromium, rhodium and manganese under conditions sufficient to convert the nitrogen oxides to gaseous nitrogen, water and carbon oxides.

2. The process according to claim 1 wherein the zeolite is exchanged with from 0.1 to about 15 wt% of the cation based upon the total weight of the exchanged zeolite.

3. The process according to claim 2 wherein the crystalline zeolite is selected from the group consisting of natural and synthetic zeolites and mordenites.

4. The process according to claim 3 wherein the methane/nitrogen oxide ratio ranges from about 0.2 to 10.

5. The process according to claim 4 wherein the reacting is conducted at temperatures ranging from 250° to 600° C. and pressures ranging from 1 to 300 atmospheres.

6. The process according to claim 5 wherein the reacting is conducted in a fixed bed reactor with a gas hourly space velocity ranging from 1,000 hr$^{-1}$ to 100,000 hr$^{-1}$.

7. The process according to claim 6 wherein the exchanged zeolite is subsequently exchanged with from 0.01 to about 2 wt%, based upon total weight of the exchanged zeolite, of an additional metal selected from the third period transition metals or Groups 5, 6, 7 and 11 of the Periodic Table of the Elements.

8. The process according to claim 6 where the metal-exchanged zeolite is impregnated with from 0.01 wt % to 15 wt %, based upon the total weight of the impregnated metal-exchanged zeolite, of an anionic or neutral species containing a metal selected from Group 5,6, 7 and 11 of the Periodic Table.

9. The process according to claim 8 wherein the species to be impregnated onto the metal-exchanged zeolite contains a metal selected from the group consisting of niobium, molybdenum, silver, vanadium and manganese.

10. The process according to claim 6 wherein a stoichiometric excess of oxygen, based upon the nitrogen oxides, is reacted with the nitrogen oxides and methane.

11. The process according to claim 1 wherein the nitrogen oxides are present in combustion products generated from the group consisting of utility boilers, industrial boilers, gas turbines and stationary engines.

12. The process according to claim 1 further comprising injecting methane from an external source into the combustion products.

13. A process for destroying nitrogen oxides comprising: reacting the nitrogen oxides, methane and oxygen in the presence of a MOR structure type zeolite which is exchanged with an effective amount of a cation selected from the group consisting of cobalt, nickel, iron, chromium, rhodium and manganese under conditions sufficient to convert the nitrogen oxides to gaseous nitrogen, water and carbon oxides.

14. The process according to claim 13 wherein the zeolite is exchanged with from 0.1 to about 15 wt% of the cation based upon the total weight of the exchanged zeolite.

15. The process according to claim 14 wherein the methane/nitrogen oxide ratio ranges from about 0.3 to 4.

16. The process according to claim 15 wherein the process is conducted at temperatures ranging from 350° to 500° C. and pressures ranging from 1 to 300 atmospheres.

17. The process according to claim 14 wherein the process is run in a fixed bed reactor with a gas hourly space velocity ranging from 7,500 hr$^{-1}$ to 30,000 hr$^{-1}$.

18. The process according to claim 15 wherein the metal-exchanged zeolite is subsequently exchanged with from 0.01 to about 2 wt %, based upon total weight of the exchanged zeolite, of an additional metal selected from the third period transition metals or Groups 5, 6, 7 and 11 of the Periodic Table of the Elements.

19. The process according to claim 18 wherein the metal-exchanged zeolite is further exchanged with a cation selected from the group consisting of chromium, nickel, manganese and silver.

20. The process according to claim 17 wherein the metal-exchanged zeolite is impregnated with 0.1 wt % to 8 wt %, based upon the total weight of the impregnated metal-exchanged zeolite, of an anionic or neutral species containing a metal selected from Group 5, 6, 7 and 11 of the Periodic Table of the Elements.

21. The process according to claim 20 wherein the species to be impregnated onto the zeolite contains a metal selected from the group consisting of niobium, molybdenum, silver, vanadium and manganese.

22. The process according to claim 13 wherein the nitrogen oxides are present in combustion products generated from the group consisting of utility boilers, industrial boilers, gas turbines and stationary engines.

23. The process according to claim 13 further comprising injecting methane from an external source into the combustion products.

24. A process for destroying nitrogen oxides comprising: reacting the nitrogen oxides, methane and oxygen in the presence of a MFI structure type zeolite which is exchanged with an effective amount of a cation selected from the group consisting of cobalt, nickel, iron, chromium, rhodium and manganese under conditions sufficient to convert the nitrogen oxides to gaseous nitrogen, water and carbon oxides.

25. The process according to claim 24 wherein the zeolite is exchanged with from 0.1 to about 15 wt % of the cation based upon the total weight of the exchanged zeolite.

26. The process according to claim 25 wherein the zeolite is selected from the group consisting of ZSM-5.

27. The process according to claim 26 wherein the methane/nitrogen oxide ratio ranges from about 0.3 to 4.

28. The process according to claim 27 wherein the process is conducted at temperatures ranging from 350° to 500° C. and pressures ranging from 1 to 300 atmospheres.

29. The process according to claim 28 wherein the process is run in a fixed bed reactor with a gas hourly space velocity ranging from 7,500 $hr^{-1}$ to 30,000 $hr^{-1}$.

30. The process according to claim 28 wherein the metal-exchanged zeolite is subsequently exchanged with from 0.01 to about 2 wt %, based upon total weight of the exchanged zeolite, of an additional metal selected from the third period transition metals or Groups 5, 6, 7 and 11 of the Periodic Table of the Elements.

31. The process according to claim 30 wherein the metal-exchanged zeolite is further exchanged with a cation selected from the group consisting of chromium, nickel, manganese and silver.

32. The process according to claim 29 wherein the metal-exchanged zeolite is impregnated with 0.1 wt % to 8 wt %, based upon the total weight of the impregnated metal-exchanged zeolite, of an anionic or neutral species containing a metal selected from Group 5, 6, 7 and 11 of the Periodic Table of the Elements.

33. The process according to claim 32 wherein the metal-exchanged zeolite is impregnated with a species containing a metal selected from the group consisting of niobium, molybdenum, silver, vanadium and manganese.

34. The process according to claim 24 wherein the nitrogen oxides are present in combustion products generated from the group consisting of utility boilers, industrial boilers, gas turbines and stationary engines.

35. The process according to claim 24 further comprising injecting methane from an external source into the combustion products.

* * * * *